April 22, 1924.  
C. SPEARMAN  
METHOD FOR CONCENTRATING ORES AND THE LIKE  
Filed March 6, 1919
1,491,110
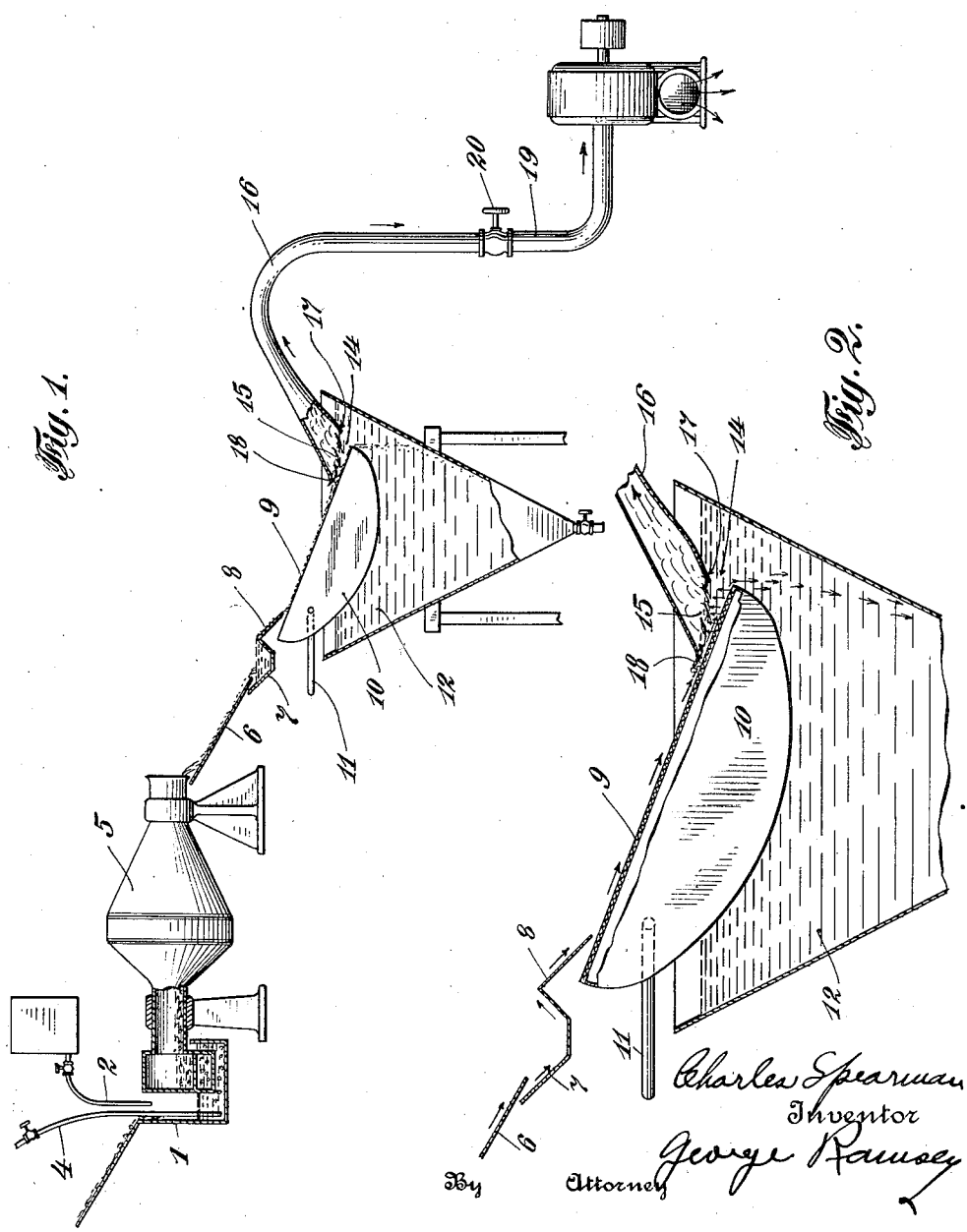

Patented Apr. 22, 1924.

1,491,110

UNITED STATES PATENT OFFICE.

CHARLES SPEARMAN, OF WESTMOUNT, QUEBEC, CANADA.

METHOD FOR CONCENTRATING ORES AND THE LIKE.

Application filed March 6, 1919. Serial No. 281,017.

*To all whom it may concern:*

Be it known that I, CHARLES SPEARMAN, a subject of the King of Great Britain, residing at Westmount, in the Province of Quebec, Dominion of Canada, have invented certain new and useful Improvements in Methods for Concentrating Ores and the like, of which the following is a specification.

This invention relates to the extraction and recovery of minerals from ther ores, and the purification of concentrates.

A principal object of the present invention is a process comprising the treatment of ore, containing from 1 to 12 per centum of moisture, with a small percentage of non-assimilating material (which in one form may be a suitable oil) in such manner as to film the desired discrete mineral particles with films which are mutually cohesive but non-assimilating with regard to the surface films of suitable flotation liquids whereby the filmed discrete particles may be recovered from the mass by suitable recovery methods.

Another object of the present invention is the process of recovering agglomerated particles of the character specified which comprises launching the treated pulp upon a suitable flotation liquid; and then lifting the floating values from the surface of the flotation liquid.

A further object of the present invention is the method of concentrating suitable desired mineral contents which comprises launching the treated pulp on a suitable flotation liquid; subjecting the pulp from beneath to gentle aeration without creating undue commotion; and then lifting the floating values by suction from the surface of the flotation liquid and adjacent the zone where the concentrates are launched.

A still further object of the present invention is the process of purifying concentrates which comprises moistening the concentrates to insure the average per centum of moisture thereof to be evenly disseminated and greater than 1 per centum and less than 12 per centum; then treating the moistened concentrate with a mixture of non-assimilating material and water to dissimilarly film the desired discrete particles from the films on the non-desired particles; then launching the treated pulp upon a suitable flotation liquid on which the concentrate will float and the similarly filmed particles will assimilate with the flotation liquid and sink; and then recovering the purified concentrate from the surface of the liquid.

This invention possesses many other and advantageous features, some of which, together with the foregoing, will be set out at length in the following description, wherein will be outlined in full that form of the invention which I have selected for illustration.

In the drawings and specification I have disclosed only the one form of my generic invention, and it is to be understood that I do not limit myself to such form, because my invention may be embodied in a multiplicity of forms, each being a species of my invention, it being understood that by the claims succeeding the description of my invention I desire to cover the invention in whatsoever form it may be embodied or practiced.

In the drawings forming a part of this application, Figure 1 is a diagrammatic sectional view of one form of my invention.

Figure 2 is a diagrammatic sectional view of one form of the launching and concentrating devices.

The process comprises providing a mixture of non-assimilating matter and water, which is thoroughly agitated; preferably in the feed-box of a suitable ball-mill or mixer. Sufficient non-assimilating material is supplied to maintain a light film over the water at substantially all times, so that the ore being introduced into the feed-box will strike the surface film first, and will then be mixed with the non-assimilating material and water in the feed-box. Preferably the amount of moisture in the ore should be controlled so that the ore shall contain not less than 1 per centum of moisture and not more than 12 per centum of moisture; and preferably the moisture should be evenly disseminated. The amount of moisture allowable depends on the nature of the ore and the minerals that it is desired to recover, and also upon the minerals that it is desired to eliminate, but in any event, the moisture should not exceed 12 per centum prior to the oil and water treatment.

I have found that the present process may also be used with success for the purification of concentrates; particularly concentrates of graphite containing mica. In carrying out the process on such concentrates it is desirable that the concentrate be sprayed with water until it is uniformly moistened; for example, to the extent of about 1 per centum of moisture, depending upon quantity of mica. The moistened concentrate is then treated with a small per centum of non-assimilating material and sufficient water to form a freely flowing pulp, and then subjected to film tension separation or stratification separation. It is desirable to first introduce the concentrate into a mixer in which there is a small per centum of non-assimilating material mixed with water. The portion of this non-assimilating material, which may be a suitable oil, covering the surface of the water will be brought into contact with the concentrate prior to or during the mixing of the concentrate with the non-assimilating material and water. During the mixing operation the graphite will become coated with a non-assimilating film and will float on the surface of the water in agglomerated form; mica will become coated with an assimilating film and will sink into the water. Where this process is carefully carried out, the graphite, or the like, will be free from mica or other deleterious mineral, and may be recovered from the surface of the flotation medium or by stratification and suction.

The concentrator comprising the preferred apparatus for carrying out the above specified processes preferably comprises a separator upon which the pulp is launched from a distributor in such manner that the launcher acts as a stratifier and when the concentrates reach the surface of the flotation liquid the materials in the pulp have assumed substantially definite strata. The preferred form of launcher is that of a device provided with a pervious member over which the concentrates travel and which pervious member is adapted to permit the passage or percolation of upwardly rising minute streams of gas which gently provides space under the concentrates so that it may be lifted off by suction with the minimum amount of moisture; furthermore this action enlivens the pulp and consequently assists in the stratification. The lower end of the launcher may extend into the body of the flotation liquid in such manner that there is a body of flotation medium of wedge-shaped cross-section between the lower end of the pervious member and the surface of the flotation body. This wedge-shaped body of liquid acts as a separation wedge, the forward edge of which extends upwardly between the strata of non-assimilating particles and assimilating particles, so that the concentrates which are filmed with non-assimilating films float over the upper surface of the wedge and the tailings travel downwardly over the submerged part of the launcher adjacent the lower portion of the wedge.

A suction member is preferably provided adjacent the upper surface of the wedge-shaped body specified and is arranged in such manner as to lift the floating values from the surface of the flotation liquid. Where the launching member is pervious, gas or air under slight pressure may be supplied beneath the pervious member and issuing therefrom in minute streams will rise through the wedge-shaped body and come up beneath the floating concentrates. It will be noted, therefore, that this construction facilitates the floating of the concentrates by subjecting these concentrates to a plurality of combined forces one of which is the suction produced above the concentrates; another is the non-assimilation between the flotation body and the films on the concentrates; a third is the action of the gently rising minute streams of gas or air; and a fourth is the peak of the ridge caused by suction and from which the concentrate leaves. This fourth or latter action is due to the fact that the back wall of the suction device preferably is arranged to comprise a barrier or dam which stops the movement of the concentrate so that the concentrate folds and rises upon itself to form a peak in the mouth of the suction member thereby greatly facilitating the removal of the concentrate from the flotation surface.

This combination of forces greatly increases the carrying capacity of the apparatus and minimizes the danger of loss in the tailings. Furthermore, masses which otherwise might sink are retained on the surface until completely lifted by the suction action. These forces facilitate the building up of the concentrates beneath the mouth of the suction member and thereby facilitate the operation of the suction device. This construction is simple in its operation, and permits a maximum tonnage to be obtained from a minimum flotation body which means a great economy in space. It also means a great economy in flotation liquid and at the same time provides for increased extraction. Furthermore, since there is no frothing action there are no slimes taken up with the concentrates, and such material as mica, etc., follows the tailings so that a substantially pure concentrate is obtained.

Referring to the drawings which illustrate diagrammatically one form of apparatus for carrying out the present invention, the ore of the per centum of moisture specified, is dumped into a feed-box 1, which is supplied with a non-assimilating material, (which in one form may comprise, for example, an oil such as kerosene) by means of the valve-controlled pipe 2, and with water by the valve-controlled pipe 4. The pulp from the ball-mill, or other suitable grinder, 5 travels onto a launder 6 and spreads out on a distributor 7, which preferably is provided with an end shake of about 250 vibrations per minute. From this distributor the pulp passes over a distributing lip 8 to the pervious side 9 of a separator 10, which preferably is hollow and is provided with an air or gas supply pipe 11. The pervious member 9 of this launcher may be canvas, a fine mesh sieve, a sheet of porous stone or other pervious material so that when air or gas under pressure is supplied through the pipe 11 the air or gas tends to escape in minute streams upwardly through the pervious member and coming in contact with the pulp on the pervious member enlivens the traveling pulp and tends to cause it to agglomerate and stratify, due to the differential filming as previously specified. The lower end of the launcher extends into the flotation liquid 12 in such manner that a wedge-shaped portion of the liquid, preferably water, extends over and above the lower end of the launcher as at 14. Preferably the open mouth 15 of a suction member 16 is arranged over the said water wedge 14 with the back wall 17 of the said mouth extending slightly below the surface of the flotation medium 12 so that it forms a barrier to stop the movement of the concentrate over the flotation surface. The forward edge of the mouth as at 18 is raised sufficiently to permit the pulp to flow under this forward edge. The suction action of the member 16 may be performed by any suitable means but preferably is obtained by means of a siphon and may be started by connecting a suction fan to the lower end of the member 16, as for example, by means of the pipe 19 and valve 20.

It will be noted by referring to Figure 2 that the tailings slide downwardly over the separator 10 and drop into the bottom of the tank. The water wedge as at 14 tends to extend upwardly into the down-coming pulp and assists in separating or splitting off the desired stratum or the concentrates, from the tailings. The separator and vacuum arrangements are connected and the separator floats on the surface of the flotation liquid thus automatically adjusting itself to variable levels of the flotation liquid.

What I claim is:

1. The process of concentrating ore which comprises mixing the ore with an agent in such a manner as to produce a pulp having dissimilar films one kind of which is adapted to prevent wetting by water and to promote agglomeration of discrete particles into buoyant masses, enlivening the pulp by injecting gases into the same from beneath to promote segregation of the differentiated constituents, launching the pulp upon the surface of a flotation body with the concentrates in the form of agglomerated masses and removal of the concentrates from the surface of the flotation body.

2. The process of concentrating ores, which comprises mixing the ore with an agent in such manner as to produce a pulp having dissimilar constituents supplied with dissimilar films, one kind of which is adapted to prevent wetting by water and promote agglomeration of discrete particles into buoyant masses, enlivening the pulp by the injection of disseminated gas thereinto from underneath a launching device to promote segregation of the differentiated constituents, launching the pulp upon the surface of a flotation body in substantially a quiescent state and lifting the concentrates from the surface of the flotation body by suction immediately upon the launching of the pulp.

3. The process of concentrating ore, comprising liberating the constituents of the ore and supplying the dissimilar constituents with dissimilar films, one kind of which is adapted to prevent wetting by water and to promote agglomeration of discrete particles into buoyant masses, enlivening the pulp by the injection of gases from underneath into the pulp, subjecting the enlivened pulp to separation on the surface of a flotation body and relieving the film tension of the separation medium so as not to cause an overload on the surface film to prevent rupturing and sinking of the concentrate by lifting the values from the surface of the flotation body immediately upon separation.

4. A process of concentrating ores comprising reducing the ore and providing dissimilar constituents with dissimilar films by means of an agent adapted to artificially differentiate such constituents, launching the pulp upon the surface of a flotation body in a tranquil state in such manner that the characterized constituents are in the form of agglomerated masses and are supported on the surface of the flotation body, injecting disseminated gas under the supported constituents to enliven the pulp and lifting the supported constituents from the surface of the flotation body.

5. The process of concentrating ores, which comprises treating the ore in such manner as to determine the moisture in the ore to be not less than one per centum or more than twelve per centum, then mixing the ore with an agent during the grinding of the ore in such manner that the pulp resulting from the grinding will have dissimilar constituents coated with dissimilar films, one kind of which is adapted to prevent wetting by water and promote agglomeration of the values into buoyant masses of discrete particles, launching the pulp upon a body of flotation liquid in substantially a quiescent state with the concentrates in the form of agglomerated masses, and enlivening the pulp during the launching by subjecting the pulp to upwardly moving minute streams of gas fed from beneath into the pulp and then lifting the concentrates from the surface of the flotation liquids.

6. The process of concentrating ore, which comprises treating the ore in such manner as to determine the moisture in the ore to be not less than one per centum or more than twelve per centum, then reducing the ore to pulp and providing dissimilar constituents with dissimilar films by means of non-assimilating agents, enlivening the pulp by the injection of gases into the pulp from underneath a launching wall launching the pulp upon the surface of a flotation body in such a manner as to provide a wedge shaped body of water adjacent the launching area so that the values are floated over the upper portion of the wedge shaped body and then lifting the values by suction.

7. The process of concentrating ore which comprises reducing the ore to comminuted form and treating it with non-assimilating agents, one of which has preferential affinity for a desired constituent of the ore, and one which is non-assimilative with water and adapted to endow particles filmed thereby with agglomerative capabilities, launching the prepared pulp upon a surface of a flotation body which is assimilative with one of said agents in such a fashion that the concentrates in the form of agglomerated masses are supported on the surface while particles having assimilative characteristics are engulfed, injecting disseminated gas from beneath into the supported material during the process of launching to enliven the pulp, and removing the concentrates from the surface of the flotation body.

CHARLES SPEARMAN.